United States Patent
Park et al.

(10) Patent No.: US 10,476,419 B2
(45) Date of Patent: Nov. 12, 2019

(54) METHOD OF CONTROLLING DUAL INVERTER

(71) Applicants: Hyundai Motor Company, Seoul (KR); Kia Motors Corporation, Seoul (KR)

(72) Inventors: Joo Young Park, Yongin-si (KR); Mu Shin Kwak, Osan-si (KR); Ho Joon Shin, Uiwang-si (KR); Su Hyun Bae, Daegu (KR); Jun Mo An, Hwaseong-si (KR); Sung Kyu Kim, Bucheon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 94 days.

(21) Appl. No.: 15/703,581

(22) Filed: Sep. 13, 2017

(65) Prior Publication Data

US 2018/0152127 A1    May 31, 2018

(30) Foreign Application Priority Data

Nov. 25, 2016 (KR) .......................... 10-2016-0157896

(51) Int. Cl.
*H02P 21/14* (2016.01)
*H02P 21/12* (2016.01)
(Continued)

(52) U.S. Cl.
CPC ............ *H02P 21/141* (2013.01); *H02P 21/06* (2013.01); *H02P 21/12* (2013.01); *H02P 27/12* (2013.01)

(58) Field of Classification Search
CPC ............ H02P 7/29; H02P 27/08; H02P 27/85
See application file for complete search history.

(56) References Cited

U.S. PATENT DOCUMENTS 7,701,156 B2 * 4/2010 Okamura ............... B60K 6/365
                                                318/255
7,847,437 B2 * 12/2010 Chakrabarti ........ B60L 11/1887
                                                307/82
(Continued)

FOREIGN PATENT DOCUMENTS

JP        2010068653 A      3/2010
KR     20040005681 A        1/2004
(Continued)

OTHER PUBLICATIONS

V. T. Somasekhar, M.R. Baiju and K. Gopakumar, Dual two-level inverter scheme for an open-end winding induction motor drive with a single DC power supply and improved DC bus utilisation, pp. 230-238 (Year: 2004).*

*Primary Examiner* — Bickey Dhakal
(74) *Attorney, Agent, or Firm* — Slater Matsil, LLP

(57) ABSTRACT

A dual inverter control method is capable of improving power efficiency of an inverter and a motor by controlling a dual inverter through 6-step control to apply a voltage to the motor in a motor driving system using the dual inverter. The dual inverter control method for controlling first and second inverters having output terminals commonly connected to a motor includes comparing all voltage commands for driving the motor with the magnitude of a DC voltage commonly applied to the first and second inverters; and generating a first voltage command with respect to an output of the first inverter and a second voltage command with respect to an output of the second inverter by selectively applying high gain over voltage modulation (HOVM) depending on a comparison result.

20 Claims, 8 Drawing Sheets

(51) Int. Cl.
*H02P 27/12* (2006.01)
*H02P 21/06* (2016.01)

(56) References Cited

U.S. PATENT DOCUMENTS

| | | | |
|---|---|---|---|
| 8,742,712 B2* | 6/2014 | Perisic | H02P 27/12 |
| | | | 318/400.02 |
| 9,537,427 B2* | 1/2017 | Jiang | H02M 7/5395 |
| 9,584,057 B2* | 2/2017 | Kim | H02P 21/22 |
| 2009/0237013 A1 | 9/2009 | Sato | |
| 2010/0060211 A1 | 3/2010 | Hashimoto et al. | |
| 2010/0127656 A1 | 5/2010 | Ohtani et al. | |
| 2016/0006381 A1 | 1/2016 | Park et al. | |

FOREIGN PATENT DOCUMENTS

| | | |
|---|---|---|
| KR | 20080066986 A | 7/2008 |
| KR | 101601444 B1 | 3/2016 |

* cited by examiner

METHOD OF CONTROLLING DUAL INVERTER

CROSS-REFERENCE TO RELATED APPLICATIONS

This application claims the priority benefit of Korean Patent Application No. 10-2016-0157896, filed on Nov. 25, 2016, in the Korean Intellectual Property Office, the disclosure of which is incorporated herein by reference.

TECHNICAL FIELD

The present invention relates to a dual inverter control method.

BACKGROUND

As global warming and environmental pollution have emerged as serious problems, research and development of environmentally-friendly cars capable of minimizing environmental pollution are actively conducted and markets therefor are gradually extended. As environmentally-friendly cars, electric vehicles, hybrid vehicles and plug-in vehicles which employ motors generating driving power using electric energy, instead of engines generating driving power by burning fossil fuel, are on the market worldwide.

Most environmentally-friendly vehicle technologies using electric energy generate vehicle driving power by providing electric energy stored in a high-voltage battery of a vehicle to an electric motor.

Such motor driving control used in environmentally-friendly vehicles requires an inverter for converting DC power provided by a battery into multi-phase AC power necessary for motor driving. Although a method of providing multi-phase AC power to a motor using a single inverter has been used, research on a dual inverter method for providing power to a motor using two inverters is underway.

An inverter converts a DC voltage applied from a battery to generate an AC voltage by on/off controlling switching elements through pulse width modulation and provides the generated AC voltage to a motor to drive the motor. When the AC voltage is supplied from the inverter to the motor, current consumed by the motor can be reduced under the same power conditions if the AC voltage is provided to the motor through 6 steps. 6-step voltage supply to the motor can improve system efficiency and fuel efficiency of environmentally-friendly vehicles such as electric cars/hybrid cars/fuel cell cars equipped with the motor as well as increasing power and efficiency of the inverter and the motor.

Accordingly, the relevant technical field requires a dual inverter control method capable of improving power efficiency of an inverter and a motor by controlling a dual inverter through 6-step control to apply a voltage to the motor in a motor driving system using the dual inverter.

The matters disclosed in this section are merely for enhancement of understanding of the general background of the invention and should not be taken as an acknowledgment or any form of suggestion that the matters form the related art already known to a person skilled in the art.

SUMMARY

The present invention relates to a dual inverter control method and, in specific embodiments, to a dual inverter control method capable of improving power efficiency of an inverter and a motor by controlling a dual inverter through 6-step control to apply a voltage to the motor in a motor driving system using the dual inverter. Embodiments of the present invention can solve or mitigate problems described above.

In accordance with an embodiment of the present invention, a dual inverter control method can be used for controlling first and second inverters having output terminals commonly connected to a motor. The method includes comparing all voltage commands for driving the motor with the magnitude of a DC voltage commonly applied to the first and second inverters, and generating a first voltage command with respect to an output of the first inverter and a second voltage command with respect to an output of the second inverter by selectively applying high gain over voltage modulation (HOVM) depending on a comparison result.

In an embodiment of the present invention, when magnitudes of all voltage commands are lower than the magnitude of the DC voltage in the comparing step, HOVM may be applied to generation of one of the first voltage command and the second voltage command.

In an embodiment of the present invention, the generating of the first voltage command and the second voltage command may include: first conversion of phase-shifting all voltage commands by a predetermined angle, converting the phase-shifted voltage commands into 3-phase phase voltage commands, and converting the 3-phase phase voltage commands into 3-phase terminal voltage commands through space vector pulse width modulation; second conversion of converting the 3-phase terminal voltage commands into d/q-axis voltage commands; calculating a gain for application of HOVM on the basis of magnitudes of the d/q-axis voltage commands and the magnitude of the DC voltage; third conversion of converting the d/q-axis voltage commands into 3-phase phase voltage commands and converting the 3-phase phase voltage commands into 3-phase terminal voltage commands through space vector pulse width modulation; multiplying the 3-phase terminal voltage commands converted through the third conversion by the gain to generate the first voltage command; fourth conversion of converting the first voltage command into a d/q-axis voltage command; phase-shifting the d/q-axis voltage command converted through the second conversion in a direction opposite the direction of the predetermined angle; converting a value generated by subtracting the d/q-axis voltage command converted through the fourth conversion from the shifted d/q-axis voltage command into a 3-phase phase voltage command and converting the 3-phase phase voltage command into a 3-phase terminal voltage command through space vector pulse width modulation to generate the second voltage command.

In an embodiment of the present invention, the generating of the first voltage command and the second voltage command may further include close magnitude overmodulation for changing the 3-phase terminal voltage commands converted through the first conversion into linearly output voltages using close magnitude overmodulation when the 3-phase terminal voltage commands converted through the first conversion are not linearly output voltages.

In an embodiment of the present invention, close magnitude overmodulation may cause a voltage range within which a common mode voltage of the first inverter and the second inverter substantially becomes 0 to be within a range of the value shifted by the predetermined angle.

In an embodiment of the present invention, the generating of the first voltage command and the second voltage command may include close magnitude overmodulation for changing the 3-phase terminal voltage commands converted through the third conversion to linearly output voltages when the 3-phase terminal voltage commands are not linearly output voltages.

In an embodiment of the present invention, the close magnitude overmodulation may be performed within a maximum voltage range of the first inverter.

In an embodiment of the present invention, the generating of the first voltage command may include changing values obtained by multiplying the 3-phase terminal voltage commands converted through the third conversion by the gain into linearly output voltages when the values are not linearly output voltages.

In an embodiment of the present invention, the generating of the first voltage command may include changing the multiplied values into linearly output voltages using close magnitude overmodulation within the maximum voltage range of the first inverter.

In an embodiment of the present invention, the generating of the first voltage command and the second voltage command may include applying HOVM to generation of the first voltage command and the second voltage command when the magnitudes of all voltage commands exceed the magnitude of the DC voltage.

In an embodiment of the present invention, the generating of the first voltage command and the second voltage command may include: first shifting of phase-shifting all voltage commands by a predetermined angle; first conversion of converting all voltage commands phase-shifted through the first shifting into 3-phase phase voltage commands and converting the 3-phase phase voltage commands into 3-phase terminal voltage commands through space vector pulse width modulation; calculating a first gain for application of HOVM on the basis of the magnitudes of all voltage commands phase-shifted through the first shifting and the magnitude of the DC voltage; generating the first voltage command by multiplying the 3-phase terminal voltage commands converted through the first conversion by the first gain; second shifting of phase-shifting all voltage commands in a direction opposite the direction of the predetermined angle; second conversion of converting all voltage commands phase-shifted through the second shifting into 3-phase phase voltage commands and converting the 3-phase phase voltage commands into 3-phase terminal voltage commands through space vector pulse width modulation; calculating a second gain for application of HOVM on the basis of the magnitudes of all voltage commands phase-shifted through the second shifting and the magnitude of the DC voltage; and generating the second voltage command by multiplying the 3-phase terminal voltage commands converted through second conversion by the second gain.

In an embodiment of the present invention, the generating of the first voltage command and the second voltage command may further include changing the 3-phase terminal commands converted through the first conversion into linearly output voltages using close magnitude overmodulation when the 3-phase terminal voltage commands are not linearly output voltages.

In an embodiment of the present invention, the overmodulation may be performed within the maximum voltage range of the first inverter.

In an embodiment of the present invention, the generating of the first voltage command may include changing values obtained by multiplying the 3-phase terminal voltage commands converted through the first conversion by the first gain into linearly output voltages when the values are not linearly output voltages.

In an embodiment of the present invention, the generating of the first voltage command may include changing the multiplied values into linearly output voltages using close magnitude overmodulation within the maximum voltage range of the first inverter.

In an embodiment of the present invention, the generating of the first voltage command and the second voltage command may include changing the 3-phase terminal commands converted through the second conversion into linearly output voltages using close magnitude overmodulation when the 3-phase terminal voltage commands are not linearly output voltages.

In an embodiment of the present invention, the overmodulation may be performed within a maximum voltage range of the second inverter.

In an embodiment of the present invention, the generating of the second voltage command may include changing values obtained by multiplying the 3-phase terminal voltage commands converted through the second conversion by the second gain into linearly output voltages when the values are not linearly output voltages.

In an embodiment of the present invention, the generating of the second voltage command may include changing the multiplied values into linearly output voltages using close magnitude overmodulation within the maximum voltage range of the second inverter.

According to the aforementioned dual inverter control method, inverter voltage utilization can be improved to increase power and efficiency, thereby remarkably improving fuel efficiency of environmentally-friendly vehicles employing the control method.

In addition, the dual inverter control method can be realized by modifying only an algorithm in hardware design, resulting in no additional cost increase due to addition of hardware.

Furthermore, the dual inverter control method does not cause a problem with respect to current controllability of a driving motor of an environmentally-friendly vehicle employing the control method because voltage utilization is improved during current control.

Moreover, the dual inverter control method can easily control a dual inverter while holding a common mode voltage at zero, thereby improving controllability.

DETAILED DESCRIPTION OF ILLUSTRATIVE EMBODIMENTS

A description will be given of dual inverter control methods according to various embodiments of the present invention with reference to the attached drawings.

Figure 1:
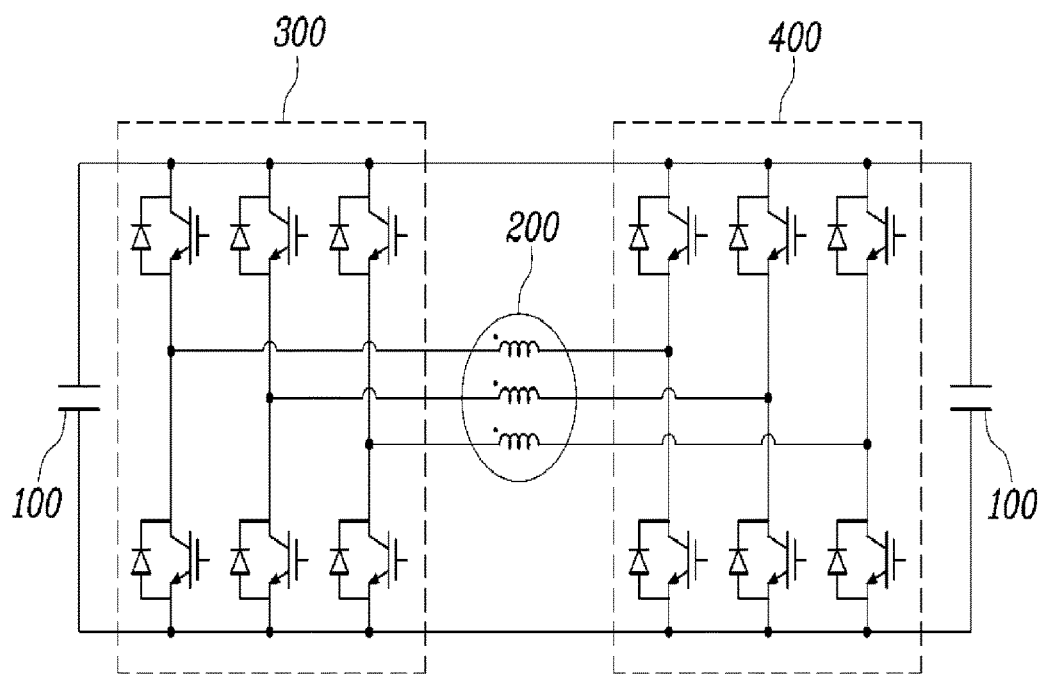
FIG. 1 is a simplified circuit diagram of a dual inverter system to which a dual inverter control method according to an embodiment of the present invention is applied.

FIG. 1 is a simplified circuit diagram of a dual inverter system to which a dual inverter control method according to an embodiment of the present invention is applied.

Referring to FIG. 1, the inverter system to which the dual inverter control method according to an embodiment of the present invention is applied may include a DC power supply unit 100 such as a battery, a motor 200, and two inverters 300 and 400 for converting DC power of the DC power supply unit 100 into AC power and providing the AC power to the motor 200.

Each of the two inverters 300 and 300 shown in FIG. 1 is connected to the DC power supply unit 100 through a common DC link and is provided with DC power and may include 6 switching elements such that two switching elements are assigned per phase in order to provide 3-phase voltage and current to the motor. Accordingly, the dual inverter system shown in FIG. 1 can drive or regenerate the motor by controlling the 6 switching elements included in the first inverter 300 and the 6 switching elements included in the second inverter 400.

Figure 2:
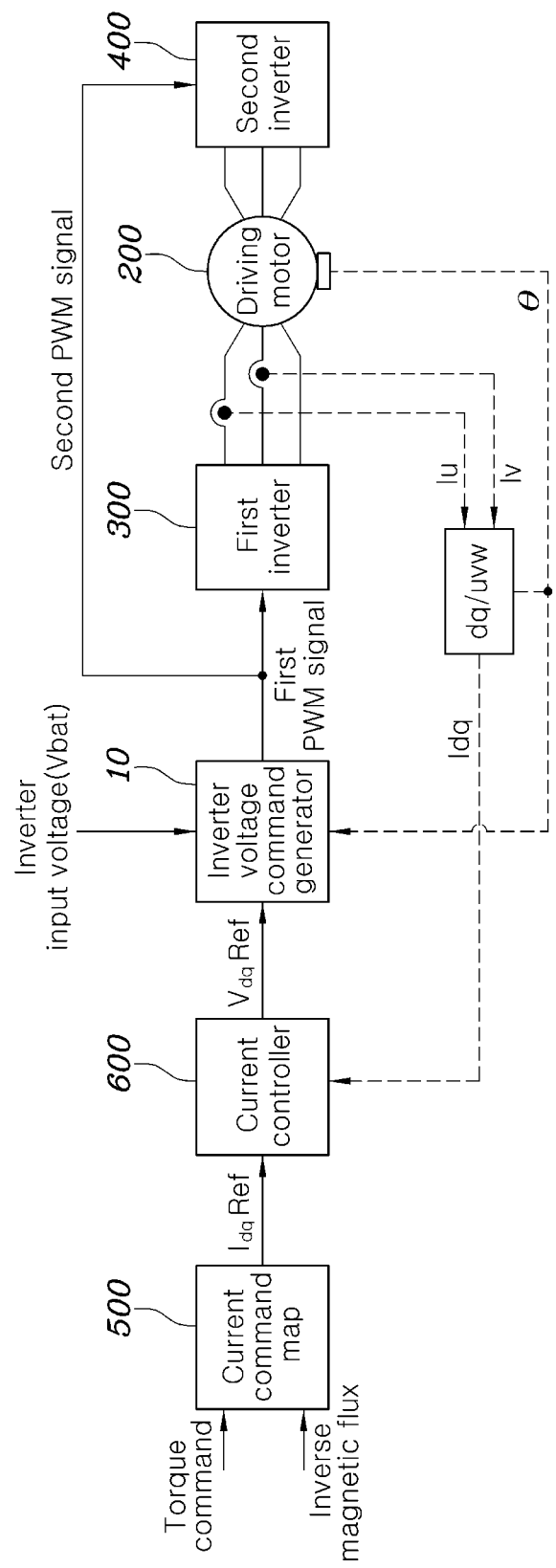
FIG. 2 is a block diagram of the entire control system to which the dual inverter control method according to an embodiment of the present invention is applied.

FIG. 2 is a block diagram of the entire control system to which the dual inverter control method according to an embodiment of the present invention is applied.

In FIG. 2, the motor 200, the first inverter 300 and the second inverter 400 have the configurations shown in FIG. 1.

A current command map 500 outputs a current command IdqREF on the basis of a torque command and an inverse magnetic flux value input from an external high-level controller. The current command output from the current command map 500 may be a d-axis current command and a q-axis current command in a stationary frame.

The current command map 500 may be generated by previously mapping torque commands and inverse magnetic flux values input thereto with current commands corresponding thereto through an experimental method or a theoretical method. Although FIG. 2 shows that the current command map 500 outputs a current command previously mapped to a torque command and an inverse magnetic flux value on the basis of the torque command and the inverse magnetic flux value, this is merely an example and a current command may be output on the basis of an input value in a different form. Furthermore, the current command map 500 is an exemplary method for generating a current command and a current command may be output through mathematical calculation instead of the map.

A current controller 600 receives d-axis current and q-axis current obtained through coordinate transformation of all or part of 3-phase currents actually measured by a current sensor (not shown) provided to the output of the first inverter and compares the d-axis current and q-axis current with the current command output from the current command map 500. The current controller 600 respectively compares the d-axis current command and q-axis current command received from the current command map 500 with the actually measured d-axis current and q-axis current and generates voltage commands using differences therebetween. The current controller 600 is configured in the form of a proportional integral (PI) controller and generates a d-axis voltage command and a q-axis voltage command in a stationary frame.

An inverter voltage command generator 10 generates voltage commands of the first inverter 300 and the second inverter 400 on the basis of the d-axis voltage command and the q-axis voltage command generated in the current controller 600, and generates and outputs PWM signals for switching elements included in the inverters, which correspond to the voltage commands of the inverters, to control the first inverter 300 and the second inverter 400.

The dual inverter control method according to an embodiment of the present invention is implemented by the inverter voltage command generator 10.

Figure 3:
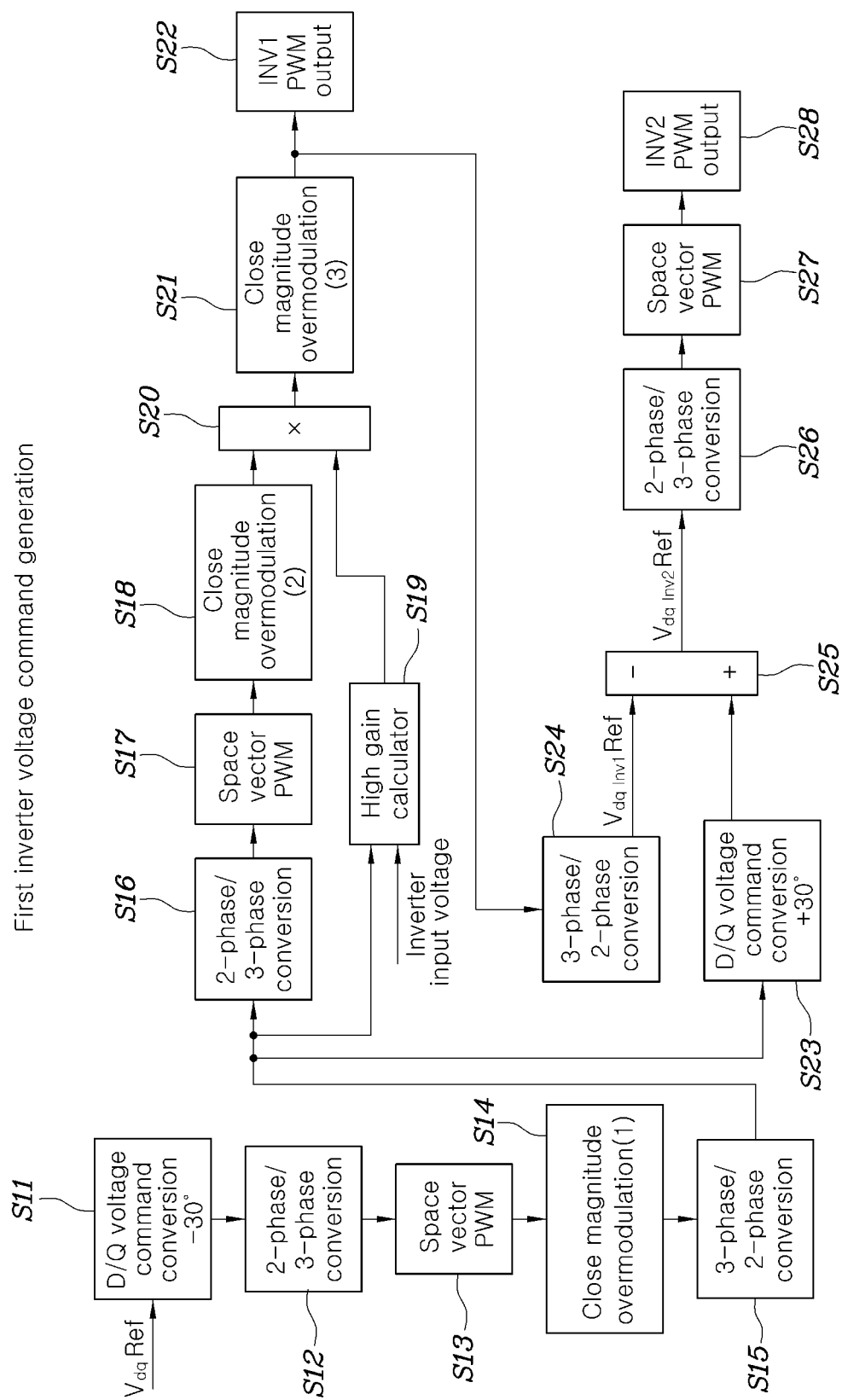
FIG. 3 is a flowchart illustrating a first inverter voltage command generation technique in the dual inverter control method according to an embodiment of the present invention.
Figure 4:
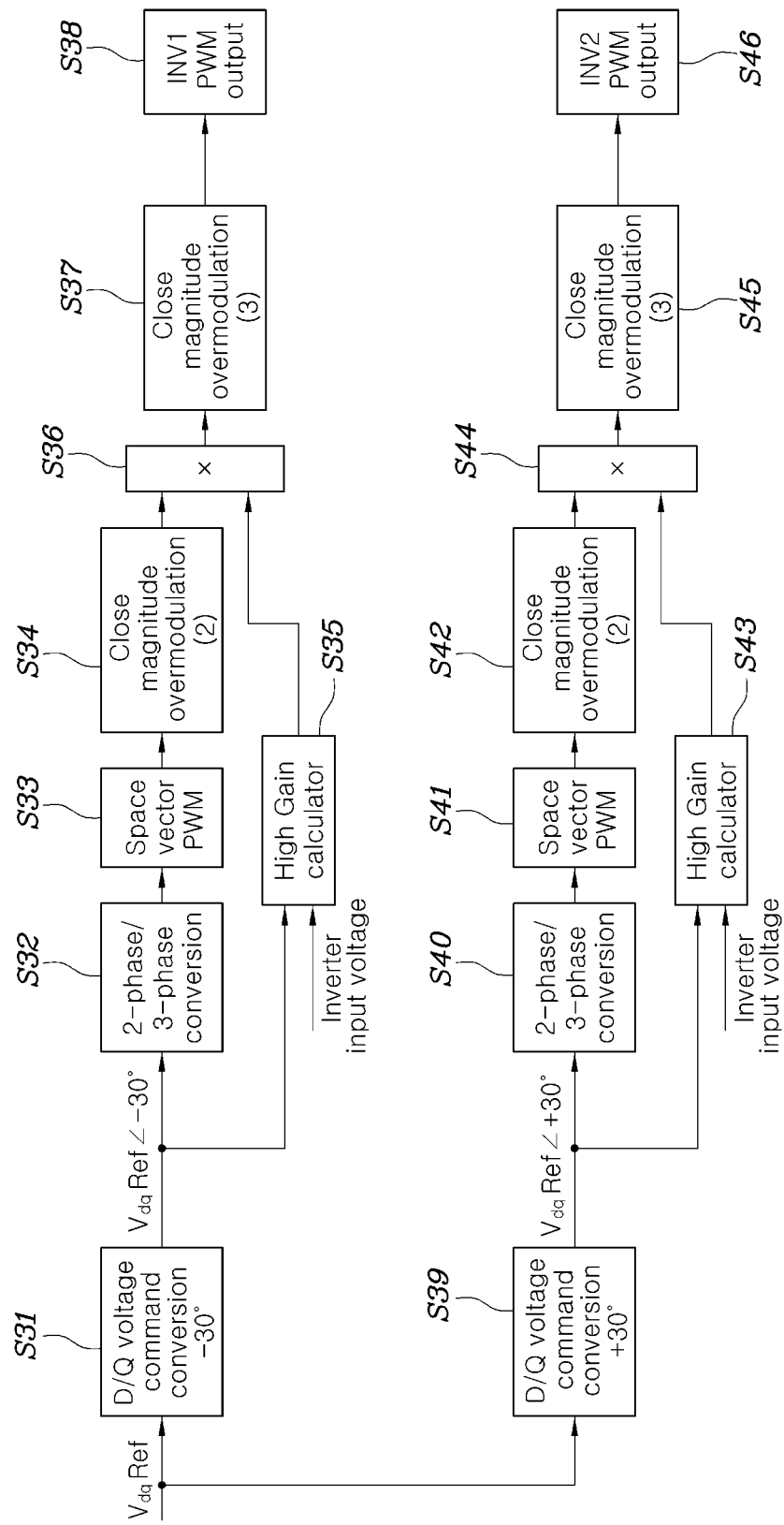
FIG. 4 is a flowchart illustrating a second inverter voltage command generation technique in the dual inverter control method according to an embodiment of the present invention.

The inverter voltage command generator 10 may selectively use inverter voltage command generation techniques illustrated in FIGS. 3 and 4.

FIG. 3 is a flowchart illustrating a first inverter voltage command generation technique in the dual inverter control method according to an embodiment of the present invention and FIG. 4 is a flowchart illustrating a second inverter voltage command generation technique in the dual inverter control method according to an embodiment of the present invention.

Referring to FIG. 3, the first inverter voltage command generation technique applied to the dual inverter control method according to an embodiment of the present invention shifts d-axis and q-axis voltage commands VdqRef input from the current controller 600 for close magnitude overmodulation by −30 degrees (or +30 degrees) (Su), converts the voltage commands into 3-phase phase voltage commands VabcRef (S12) and then converts the 3-phase phase voltage commands into 3-phase terminal voltage commands VabcnRef through space vector pulse width modulation (S13).

When the 3-phase terminal voltage commands VabcnRef include a voltage that cannot be linearly output, the voltage is changed into a voltage that can be linearly output through close magnitude overmodulation (S14). Close magnitude overmodulation refers to a method of setting a new voltage command vector such that a magnitude difference from a 3-phase terminal voltage command vector is reduced. Detailed description of close magnitude overmodulation is omitted because it is known in the art. Here, a voltage range when close magnitude overmodulation (S14) is applied needs to be within a range shifted by −30 degrees (or +30 degrees) from the voltage range within which the common mode voltage of the first inverter 300 and the second inverter 400 becomes 0.

The 3-phase terminal voltage commands close-magnitude-overmodulated in step S14 are converted into d/q-axis voltage commands (S15).

Subsequently, the d/q-axis voltage commands generated in step S15 are converted into 3-phase voltage commands (S16), space vector pulse width modulation is performed on the 3-phase voltage commands (S17) and then close magnitude overmodulation is performed thereon. Gain calculation is performed by a high gain calculator for high gain over voltage modulation (HOVM) using the d/q-axis voltage commands generated in step S15 (S19).

Here, a voltage range of close magnitude overmodulation is within a range of maximum voltage that can be output from the first inverter 300.

If a voltage that cannot be linearly output is generated when the 3-phase terminal voltage commands generated through close magnitude overmodulation performed in step S18 are multiplied by the output of the high gain calculator (S20), the voltage is changed into a voltage that can be linearly output using close magnitude overmodulation (S21) and the changed 3-phase terminal voltage commands are output as final 3-phase terminal voltage commands for controlling the switching elements of the first inverter 300 (S22).

The 3-phase terminal voltage commands generated in step S21 are converted into d/q-axis voltage commands VdqInv2Ref through transformation and subtracted from a value generated by shifting the voltage commands output in step S15 by +30 degrees (or −30 degrees) (shifting in a direction opposite the shifting direction of step S11) (S23) in step S25.

Since the voltage commands generated through subtraction in step S25 correspond to d/q-axis voltage commands of the second inverter 400, the voltage commands are converted into 3-phase phase voltage commands (S26), transformed into 3-phase terminal voltage commands through space vector pulse width modulation (S27) and provided as a pulse width modulation output of the second inverter 400 (S28).

Figure 5:
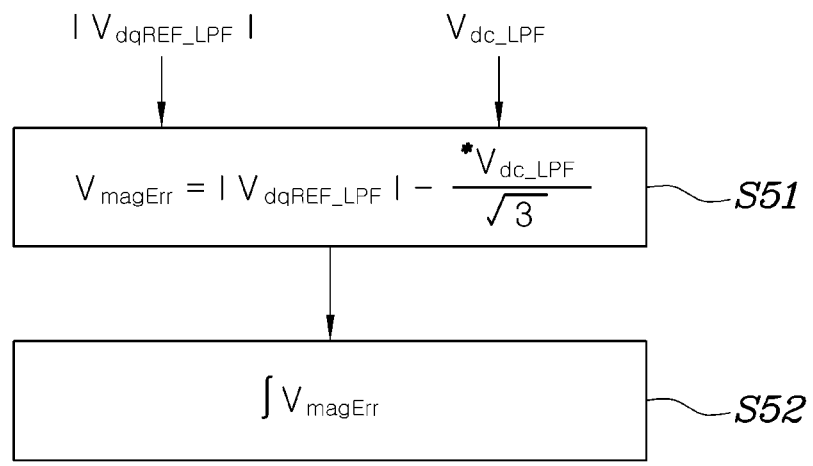
FIG. 5 is a flowchart illustrating a high gain generation technique used in the dual inverter control method according to an embodiment of the present invention.

In the inverter voltage command generation process illustrated in FIG. 3, high gain calculation in step S19 may be performed as illustrated in FIG. 5.

FIG. 5 is a flowchart illustrating a high gain generation technique used in the dual inverter control method according to an embodiment of the present invention.

As illustrated in FIG. 5, the high gain generation step S19 can obtain the magnitude |VdqREF_LPF| of a d-axis/q-axis voltage command corresponding to the output value of the current controller 600, calculate a difference VmagErr between the magnitude |VdqREF_LPF| of the d-axis/q-axis voltage command and a value obtained by dividing an inverter input voltage Vdc_LPF by the square root of 3 (S51) and then obtain a high gain from the error value VmagErr calculated in step S51 through an integrator. The high gain calculated in this manner is multiplied by the 3-phase terminal voltage command values, which have been close-magnitude-overmodulated in step S18, through step S20 and the multiplication result is close-magnitude-overmodulated (S21) and provided as a pulse width modulation output of the first inverter 300.

Figure 6:
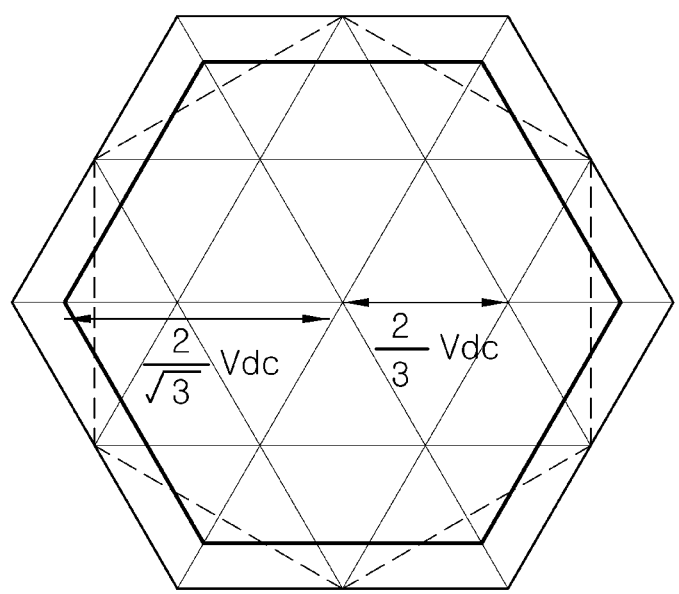
FIGS. 6 and 7 illustrate voltage limitation ranges of close magnitude overmodulation applied to the dual inverter control method shown in FIG. 5.
Figure 7:
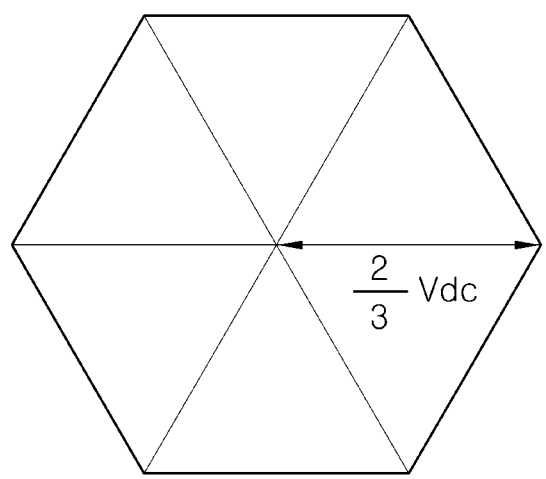

FIGS. 6 and 7 illustrate voltage limitation ranges of close magnitude overmodulation applied to the dual inverter control method shown in FIG. 5. Particularly, FIG. 6 shows a voltage limitation range of close magnitude overmodulation applied to step S14 of FIG. 5. In this case, a voltage range is limited to the area indicated by "A" in consideration of voltage vectors of the two inverters 300 and 400. FIG. 7 shows a voltage limitation range of close magnitude overmodulation applied to steps S18 and S21. In this case, a voltage range is limited to the area indicated by "B" in consideration of the voltage vector of the first inverter 300.

Referring to FIG. 4, another inverter voltage command generation technique used in the dual inverter control method according to an embodiment of the present invention controls the first inverter 300 and the second inverter 400 through HOVM.

For pulse width modulation output of the first inverter 300, d-axis and q-axis voltage commands VdqRef input from the current controller 600 are shifted by −30 degrees (or +30 degrees) (S31), converted into 3-phase phase voltage commands VabcsRef (S32) and then converted into 3-phase terminal voltage commands VabcnRef through space vector pulse width modulation (S33). If the 3-phase terminal voltage commands VabcnRef includes a voltage that cannot be linearly output in step S33, the voltage is changed into a voltage that can be linearly output using close magnitude overmodulation (S34).

Gain calculation is performed by a high gain calculator for HOVM using the d/q-axis voltage commands generated in step S31 (S35). Gain calculation by the high gain calculator may be performed in substantially the same as the manner described with reference to FIG. 5 to calculate a gain for HOVM on the basis of magnitudes of the phase-shifted voltage commands and the magnitude of the DC voltage. If a voltage that cannot be linearly output is generated when the 3-phase terminal voltage commands generated through close magnitude overmodulation performed in step S18 are multiplied by the output of the high gain calculator (S36), the voltage is changed into a voltage that can be linearly output using close magnitude overmodulation (S37) and output as final 3-phase terminal voltage commands for controlling the switching elements of the first inverter 300 for pulse width modulation with respect to the first inverter (S38).

Here, close magnitude overmodulation in steps S34 and S37 needs to be performed within the maximum voltage range of the first inverter 300.

For pulse width modulation output of the second inverter 400, similarly to the method of generating a pulse width modulation output of the first inverter 300, d-axis and q-axis voltage commands VdqRef input from the current controller 600 are shifted by −30 degrees (or +30 degrees) (S39), converted into 3-phase phase voltage commands VabcsRef (S40) and then converted into 3-phase terminal voltage commands VabcnRef through space vector pulse width modulation (S41). If the 3-phase terminal voltage commands VabcnRef include a voltage that cannot be linearly output in step S41, the voltage is changed into a voltage that can be linearly output using close magnitude overmodulation (S42).

Gain calculation is performed by a high gain calculator for HOVM using the d/q-axis voltage commands generated in step S39 (S43). Gain calculation by the high gain calculator is substantially the same as gain calculation described with reference to FIG. 5. If a voltage that cannot be linearly output is generated when the 3-phase terminal voltage commands generated through close magnitude overmodulation performed in step S42 are multiplied by the output of the high gain calculator (S43), the voltage is changed into a voltage that can be linearly output using close magnitude overmodulation (S45) and output as final 3-phase terminal voltage commands for controlling the switching elements of the second inverter 400 for pulse width modulation with respect to the second inverter (46).

Here, close magnitude overmodulation in steps S42 and S45 needs to be performed within the maximum voltage range of the second inverter 400.

Figure 8:
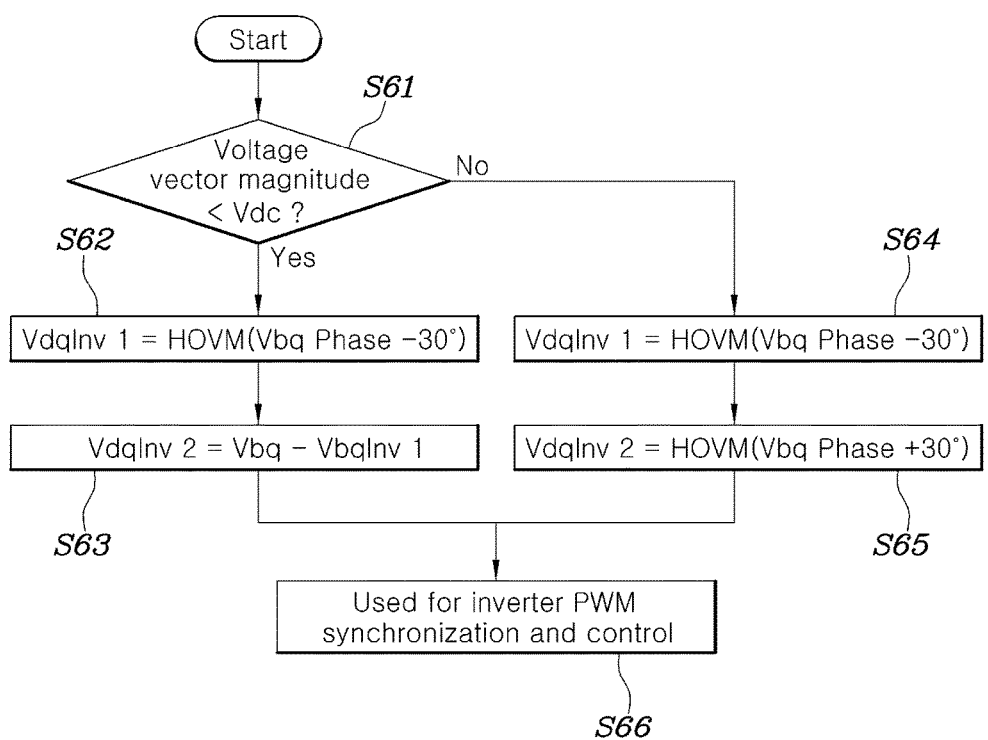
FIG. 8 is a flowchart illustrating an example wherein the inverter voltage command generation techniques shown in FIGS. 3 and 4 are applied.

FIG. 8 is a flowchart illustrating an example wherein the inverter voltage command generation techniques shown in FIGS. 3 and 4 are applied.

As illustrated in FIG. 8, in an embodiment of the present invention, an inverter voltage command generator may use the inverter voltage command generation technique illustrated in FIG. 3, which compares the magnitude of an input voltage command vector with the magnitude Vdc of a DC voltage supplied to the inverters 300 and 400 from the DC power supply unit (battery) 100 (S61), applies HOVM to a process of generating a pulse width modulation signal of the first inverter 300 when the magnitude of the voltage command vector is lower than the magnitude Vdc of the DC voltage (S62) and derives a pulse width modulation signal of the second inverter 400 by subtracting a voltage command used to control the first inverter from all voltage commands (S63).

If the magnitude of the voltage command vector exceeds the magnitude Vdc of the DC voltage in step S61, the inverter voltage command generation technique of FIG. 4, which produces the pulse width modulation signals of the first inverter 300 and the second inverter 400 using HOVM, can be used.

The dual inverter control methods according to various embodiments of the present invention, described above, can improve power and efficiency by increasing inverter voltage utilization, thereby enhancing fuel efficiency.

Furthermore, the dual inverter control methods according to various embodiments of the present invention can be implemented by modifying only an algorithm in hardware design, causing no additional cost increase due to addition of hardware.

In addition, the dual inverter control methods according to various embodiments of the present invention can increase voltage utilization while performing current control and thus do not cause a problem in current controllability of driving motors of environmentally-friendly vehicles to which the control methods are applied.

Moreover, the dual inverter control methods according to various embodiments of the present invention can control inverters while a common mode voltage is held at zero, improving controllability.

Although specific embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling first and second inverters having output terminals commonly connected to a motor, the method comprising:
    comparing all voltage commands for driving the motor with the magnitude of a DC voltage commonly applied to the first and second inverters; and
    generating a first voltage command with respect to an output of the first inverter and a second voltage command with respect to an output of the second inverter by selectively applying high gain over voltage modulation (HOVM) depending on a result of the comparing, wherein generating the first voltage command and the second voltage command comprises applying HOVM to generate the first voltage command and the second voltage command when magnitudes of all voltage commands are lower than the magnitude of the DC voltage in the comparing step, wherein generating the first voltage command and the second voltage command comprises:
        performing a first conversion to phase-shift all voltage commands by a predetermined angle, to convert the phase-shifted voltage commands into 3-phase phase voltage commands, and to convert the 3-phase phase voltage commands into 3-phase terminal voltage commands through space vector pulse width modulation;
        performing a second conversion to convert the 3-phase terminal voltage commands into d/q-axis voltage commands;
        calculating a gain for application of HOVM based on magnitudes of the d/q-axis voltage commands and the magnitude of the DC voltage;
        performing a third conversion to convert the d/q-axis voltage commands into 3-phase phase voltage commands and to convert the 3-phase phase voltage commands into 3-phase terminal voltage commands through space vector pulse width modulation;
        multiplying the 3-phase terminal voltage commands converted through the third conversion by the gain to generate the first voltage command;
        performing a fourth conversion to convert the first voltage command into a d/q-axis voltage command;
        phase-shifting the d/q-axis voltage command converted through the second conversion in a direction opposite the direction of the predetermined angle; and
        converting a value generated by subtracting the d/q-axis voltage command converted through the fourth conversion from the phase-shifted d/q-axis voltage command into a 3-phase phase voltage command and converting the 3-phase phase voltage command into a 3-phase terminal voltage command through space vector pulse width modulation to generate the second voltage command.

2. The method according to claim 1, wherein generating the first voltage command and the second voltage command further comprises performing close magnitude overmodulation to change the 3-phase terminal voltage commands converted through the first conversion into linearly output voltages using close magnitude overmodulation when the 3-phase terminal voltage commands converted through the first conversion are not linearly output voltages.

3. The method according to claim 2, wherein the close magnitude overmodulation causes a voltage range within which a common mode voltage of the first inverter and the second inverter substantially becomes 0 to be within a range of the value shifted by the predetermined angle.

4. The method according to claim 1, wherein generating the first voltage command and the second voltage command comprises performing close magnitude overmodulation to change the 3-phase terminal voltage commands converted through the third conversion to linearly output voltages when the 3-phase terminal voltage commands are not linearly output voltages.

5. The method according to claim 4, wherein the close magnitude overmodulation is performed within a maximum voltage range of the first inverter.

6. The method according to claim 1, wherein generating the first voltage command comprises changing values obtained by multiplying the 3-phase terminal voltage commands converted through the third conversion by the gain into linearly output voltages when the values are not linearly output voltages.

7. The method according to claim 6, wherein generating the first voltage command comprises changing the multiplied values into linearly output voltages using close magnitude overmodulation within a maximum voltage range of the first inverter.

8. A method for controlling first and second inverters having output terminals commonly connected to a motor, the method comprising:
    comparing all voltage commands for driving the motor with the magnitude of a DC voltage commonly applied to the first and second inverters;
    generating a first voltage command with respect to an output of the first inverter and a second voltage command with respect to an output of the second inverter by selectively applying high gain over voltage modulation (HOVM) depending on a result of the comparing, wherein generating the first voltage command and the second voltage command comprises applying HOVM to generate the first voltage command and the second voltage command when the magnitudes of all voltage commands exceed the magnitude of the DC voltage, wherein generating the first voltage command and the second voltage command comprises:
performing a first shifting to phase-shift all voltage commands by a predetermined angle;
performing a first conversion to convert all voltage commands phase-shifted through the first shifting into 3-phase phase voltage commands and to convert the 3-phase phase voltage commands into 3-phase terminal voltage commands through space vector pulse width modulation;
calculating a first gain for application of HOVM based on the magnitudes of all voltage commands phase-shifted through the first shifting and the magnitude of the DC voltage;
generating the first voltage command by multiplying the 3-phase terminal voltage commands converted through the first conversion by the first gain;
performing a second shifting to phase-shift all voltage commands in a direction opposite the direction of the predetermined angle;
performing a second conversion to convert all voltage commands phase-shifted through the second shifting into 3-phase phase voltage commands and to convert the 3-phase phase voltage commands into 3-phase terminal voltage commands through space vector pulse width modulation;
calculating a second gain for application of HOVM based on the magnitudes of all voltage commands phase-shifted through the second shifting and the magnitude of the DC voltage; and
generating the second voltage command by multiplying the 3-phase terminal voltage commands converted through second conversion by the second gain.

9. The method according to claim 8, wherein generating the first voltage command and the second voltage command further comprises changing the 3-phase terminal voltage commands converted through the first conversion into linearly output voltages using close magnitude overmodulation when the 3-phase terminal voltage commands are not linearly output voltages.

10. The method according to claim 9, wherein the overmodulation is performed within a maximum voltage range of the first inverter.

11. The method according to claim 8, wherein generating the first voltage command comprises changing values obtained by multiplying the 3-phase terminal voltage commands converted through the first conversion by the first gain into linearly output voltages when the values are not linearly output voltages.

12. The method according to claim 11, wherein generating the first voltage command comprises changing the multiplied values into linearly output voltages using close magnitude overmodulation within a maximum voltage range of the first inverter.

13. The method according to claim 8, wherein generating the first voltage command and the second voltage command comprises changing the 3-phase terminal voltage commands converted through the second conversion into linearly output voltages using close magnitude overmodulation when the 3-phase terminal voltage commands are not linearly output voltages.

14. The method according to claim 13, wherein the overmodulation is performed within a maximum voltage range of the second inverter.

15. The method according to claim 8, wherein generating the second voltage command comprises changing values obtained by multiplying the 3-phase terminal voltage commands converted through the second conversion by the second gain into linearly output voltages when the values are not linearly output voltages.

16. The method according to claim 15, wherein generating the second voltage command comprises changing the multiplied values into linearly output voltages using close magnitude overmodulation within a maximum voltage range of the second inverter.

17. A method for controlling first and second inverters having output terminals commonly connected to a motor, the method comprising:
comparing all voltage commands for driving the motor with the magnitude of a DC voltage commonly applied to the first and second inverters; and
performing a first conversion to phase-shift all voltage commands by a predetermined angle, to convert the phase-shifted voltage commands into 3-phase phase voltage commands, and to convert the 3-phase phase voltage commands into 3-phase terminal voltage commands through space vector pulse width modulation;
performing a second conversion to convert the 3-phase terminal voltage commands into d/q-axis voltage commands;
calculating a gain for application of high gain over voltage modulation (HOVM) based on magnitudes of the d/q-axis voltage commands and the magnitude of the DC voltage;
performing a third conversion to convert the d/q-axis voltage commands into 3-phase phase voltage commands and to convert the 3-phase phase voltage commands into 3-phase terminal voltage commands through space vector pulse width modulation;
multiplying the 3-phase terminal voltage commands converted through the third conversion by the gain to generate a first voltage command with respect to an output of the first inverter;
performing a fourth conversion to convert the first voltage command into a d/q-axis voltage command;
phase-shifting the d/q-axis voltage command converted through the second conversion in a direction opposite the direction of the predetermined angle;
converting a value generated by subtracting the d/q-axis voltage command converted through the fourth conversion from the phase-shifted d/q-axis voltage command into a 3-phase phase voltage command; and
converting the 3-phase phase voltage command into a 3-phase terminal voltage command through space vector pulse width modulation to generate a second voltage command with respect to an output of the second inverter.

18. The method according to claim 17, wherein magnitudes of all voltage commands are lower than the magnitude of the DC voltage and wherein generating the first voltage command and the second voltage command further comprises performing close magnitude overmodulation to change the 3-phase terminal voltage commands converted through the first conversion into linearly output voltages using close magnitude overmodulation when the 3-phase terminal voltage commands converted through the first conversion are not linearly output voltages.

19. The method according to claim 17, wherein magnitudes of all voltage commands are lower than the magnitude of the DC voltage and wherein generating the first voltage command and the second voltage command comprises performing close magnitude overmodulation to change the 3-phase terminal voltage commands converted through the third conversion to linearly output voltages when the 3-phase terminal voltage commands are not linearly output voltages.

20. The method according to claim 17, wherein the magnitudes of all voltage commands exceed the magnitude of the DC voltage and wherein generating the first voltage command and the second voltage command further comprises changing the 3-phase terminal voltage commands converted through the first conversion into linearly output voltages using close magnitude overmodulation when the 3-phase terminal voltage commands are not linearly output voltages.

* * * * *